United States Patent
Kobayashi et al.

(10) Patent No.: US 7,679,815 B2
(45) Date of Patent: Mar. 16, 2010

(54) INFORMATION DISPLAY PANEL AND INFORMATION DISPLAY DEVICE

(75) Inventors: Taichi Kobayashi, Tokyo (JP); Ryo Sakurai, Tokyo (JP); Takanori Shoji, Tokyo (JP)

(73) Assignee: Bridgestone Corporation, Tokyo (JP)

( * ) Notice: Subject to any disclaimer, the term of this patent is extended or adjusted under 35 U.S.C. 154(b) by 302 days.

(21) Appl. No.: 11/658,171

(22) PCT Filed: Jul. 22, 2005

(86) PCT No.: PCT/JP2005/013463

§ 371 (c)(1),
(2), (4) Date: Jan. 23, 2007

(87) PCT Pub. No.: WO2006/011418

PCT Pub. Date: Feb. 2, 2006

(65) Prior Publication Data

US 2008/0297881 A1 Dec. 4, 2008

(30) Foreign Application Priority Data

Jul. 26, 2004 (JP) ............................ 2004-217446

(51) Int. Cl.
*G02B 26/00* (2006.01)
*G09G 3/34* (2006.01)
(52) U.S. Cl. ...................................... 359/296; 345/107
(58) Field of Classification Search .................. 359/296; 345/107; 204/600; 430/32
See application file for complete search history.

(56) References Cited

U.S. PATENT DOCUMENTS

| 2001/0046081 | A1 | 11/2001 | Hayashi et al. |
| 2001/0046801 | A1 | 11/2001 | Hayashi et al. |
| 2006/0152136 | A1 * | 7/2006 | Fujikake et al. ............. 313/503 |

FOREIGN PATENT DOCUMENTS

JP 57-130014 A 8/1982

(Continued)

OTHER PUBLICATIONS

"Handbook of chemical and industrial products", Chemical Industry Press, Ed. 3, Jan. 1999.

(Continued)

*Primary Examiner*—William C Choi
(74) *Attorney, Agent, or Firm*—Sughrue Mion, PLLC

(57) ABSTRACT

In the information display panel, in which one or more groups of display media are sealed between opposed two substrates, at least one substrate being transparent, and, in which the display media, to which an electrostatic field generated between the substrates is applied, are made to move so as to display information such as an image, at least one substrate of the two substrates (both substrates in the figure) is a laminated substrate in which a first substrate, a low elastic layer and a second substrate are successively laminated from an outer surface, so that a stress concentration at a rib adhesion portion and so on of a partition wall can be reduced, If the laminated substrate with a laminated construction including a buffer layer for reducing stress concentration, it is possible to provide the information display panel, which can improve a mechanical strength with respect to an external force.

16 Claims, 7 Drawing Sheets

FOREIGN PATENT DOCUMENTS

| | | | |
|---|---|---|---|
| JP | 61-15128 | A | 1/1986 |
| JP | 2002-14377 | A | 1/2002 |
| JP | 2002-162652 | A | 6/2002 |
| JP | 2003-202603 | A | 7/2003 |
| JP | 2003-222914 | A | 8/2003 |

OTHER PUBLICATIONS

European Search Report dated Feb. 1, 2008.

Lindner A., et al., "Rheological and adhesive properties of model acrylic adhesives," Proceedings of the 27th Annual Meeting of the Adhesion Society, Feb. 18, 2004, pp. 293-295.

"Compounding information of rubber, compounding agent and rubber material," edited by Chemical industry training unit and so on, Chemical Industry Press, Apr. 1997, p. 127, table 2-2, Partial Translation.

* cited by examiner flexure test at f=2cm

INFORMATION DISPLAY PANEL AND INFORMATION DISPLAY DEVICE

TECHNICAL FIELD

The present invention relates to an information display panel, in which one or more groups of display media are sealed between opposed two substrates, at least one substrate being transparent, and, in which the display media, to which an electrostatic field generated between the substrates is applied, are made to move so as to display information such as an image, and an information display device installing the above information display panel.

BACKGROUND ART

As an information display device substitutable for liquid crystal information display devices (LCD), with the use of technology such as an electrophoresis method, an electrochromic method, a thermal method, dichroic-particles-rotary method are proposed.

As for these information display devices, it is conceivable as inexpensive visual display device of the next generation from a merit having wide field of vision close to normal printed matter, having smaller consumption, or having a memory function, as compared with LCD, and spreading out to a display for portable device and an electronic paper is expected. Recently, electrophoresis method is proposed that microencapsulate dispersion liquid made up with dispersion particles and coloration solution and dispose the liquid between faced substrates, and also it is expected.

However, in the electrophoresis method, there is a problem that a response rate is slow by the reason of viscosity resistance because the particles migrate among the electrophoresis solution. Further, there is a problem of lacking imaging repetition stability, because particles with high specific gravity of titanium oxide is scattered within solution of low specific gravity, it is easy to subside, difficult to maintain a stability of dispersion state. Even in the case of microencapsulating, cell size is diminished to a microcapsule level in order to make it hard to appear, however, an essential problem was not overcome at all.

Besides the electrophoresis method using behavior in the solution, recently, a method wherein electro-conductive particles and a charge transport layer are installed in a part of the substrate without using solution is proposed. [The Imaging Society of Japan "Japan Hardcopy '99" (Jul. 21-23, 1999) Transaction Pages 249-252] However, the structure becomes complicated because the charge transport layer and further a charge generation layer are to be arranged. In addition, it is difficult to constantly dissipate charges from the electro-conductive particles, and thus there is a drawback on the lack of stability.

As one method for overcoming the various problems mentioned above, an information display, in which one or more groups of display media are sealed between opposed two substrates, at least one substrate being transparent, and, in which the display media, to which an electrostatic field generated between the substrates is applied, are made to move so as to display information such as an image, is known. In the known information display panel of this kind, a glass substrate is often used for the above two substrates, but the information display panel using the glass substrate cannot be applied to a field, which needs flexibility. Therefore, in order to construct the information display panel applicable for the filed, which needs flexibility, the information display panel constructed by using a film substrate as the above substrate is proposed. As one example, there is the information display panel constructed by using a film substrate made of a low permeable film such as PES, PC and so on.

In the information display panel constructed by using the film substrate made of a low permeable film mentioned above, use is made of polyethersulfone (PES) or polycarbonate (PC) as the low permeable film, and such a low permeable film is thick and has a predetermined elasticity. In this case, if a stress such as flexure and so on is applied, a stress is concentrated at a rib adhesion portion and so on of the partition walls, which construct a cell between two substrates, and thus there is a possibility to apply a mechanical damage to the information display panel. Therefore, the substrate, to which an external force is at least applied, needs to be a construction in which a stress concentration can be reduced.

DISCLOSURE OF INVENTION

The present invention has for its object to provide an information display panel, which can maintain a mechanical strength with respect to an external force by using a laminated substrate, in which a low elastic layer at least for the substrate, to which an external force is applied.

In order to achieve-the object mentioned above, the information display panel according to the invention, in which one or more groups of display media are sealed between opposed two substrates, at least one substrate being transparent, and, in which the display media, to which an electrostatic field generated between the substrates is applied, are made to move so as to display information such as an image, is characterized in that at least one substrate of the two substrates is a laminated substrate in which a first substrate, a low elastic layer and a second substrate are successively laminated from an outer surface.

In the information display panel according to the invention, it is preferred that the two substrates are constructed by the laminated substrate, and the first substrate and the second substrate are made of a film substrate so as to obtain flexibility.

In the information display panel according to the invention, it is preferred that an electrode is arranged to an inner surface of the second substrate.

In the information display panel according to the invention, it is preferred that, in the case such that a front substrate at an observer side is constructed by the laminated substrate, the first substrate, the low elastic layer and the second substrate are constructed by a transparent material.

In the information display panel according to the invention, it is preferred that, in the case such that a front substrate at an observer side is constructed by the laminated substrate, the first substrate, the low elastic layer, the second substrate and the electrode arranged to an inner side of the second substrate are constructed by a transparent material.

In the information display panel according to the invention, it is preferred that, in the laminated substrate, at least one of the first substrate, the low elastic layer and the second substrate is constructed by a material having excellent water barrier property, while, in the other substrate, the substrate is constructed by a material having excellent water barrier property.

In the information display panel according to the invention, it is preferred that the low elastic layer has dynamic elastic modulus of 0.01-10 MPa and is made of adhesive agent or tackiness agent having a thickness of 1-100 μm.

In the information display panel according to the invention, it is preferred that the display media are particles or liquid powders.

In the information display device according to the invention, the information display panel mentioned above is installed.

According to the information display panel of the invention having the construction mentioned above, in the information display panel, in which one or more groups of display media are sealed between opposed two substrates, at least one substrate being transparent, and, in which the display media, to which an electrostatic field generated between the substrates is applied, are made to move so as to display information such as an image, at least one substrate of the two substrates is a laminated substrate in which a first substrate, a low elastic layer and a second substrate are successively laminated from an outer surface. Therefore, in the case such that a stress such as flexure and so on is applied to the substrate arranged at a side of the information display panel to which an external force is applied, it is possible to reduce a stress concentration at a rib adhesion portion and so on of the partition walls, which construct a cell between the substrates, by means of the low elastic layer arranged in the laminated substrate as a substrate intermediate layer. Therefore, it is possible to provide the information display panel, which can maintain a mechanical strength with respect to an external force and the information display device in which the information display panel mentioned above is installed.

BRIEF DESCRIPTION OF DRAWINGS

FIGS. 1a and 1b are schematic views respectively showing one embodiment of the information display panel according to the invention.

FIGS. 2a and 2b are schematic views respectively illustrating another embodiment of the information display panel according to the invention.

FIGS. 3a and 3b are schematic views respectively depicting still another embodiment of the information display panel according to the invention.

FIG. 4a is a schematic view explaining one construction of the information display panel according to the invention; FIG. 4b is a schematic view explaining another construction of the information display panel according to the invention; and FIG. 4c is a schematic view showing one shape of a gap spacer used in FIG. 4b.

FIGS. 5a and 5b are schematic views respectively explaining still another construction of the information display panel according to the invention.

FIG. 6 is a schematic view showing one embodiment of a shape of the partition walls in the information display panel according to the invention.

FIG. 7 is a schematic view explaining an outer dimension of the information display panels according to the examples 1-5 and the comparative examples 1, 2.

FIG. 8 is a schematic view explaining a repeated flexure test performed with respect to the information display panels according to the examples 1-5 and the comparative examples 1, 2.

BEST MODE FOR CARRYING OUT THE INVENTION

Figure 1:
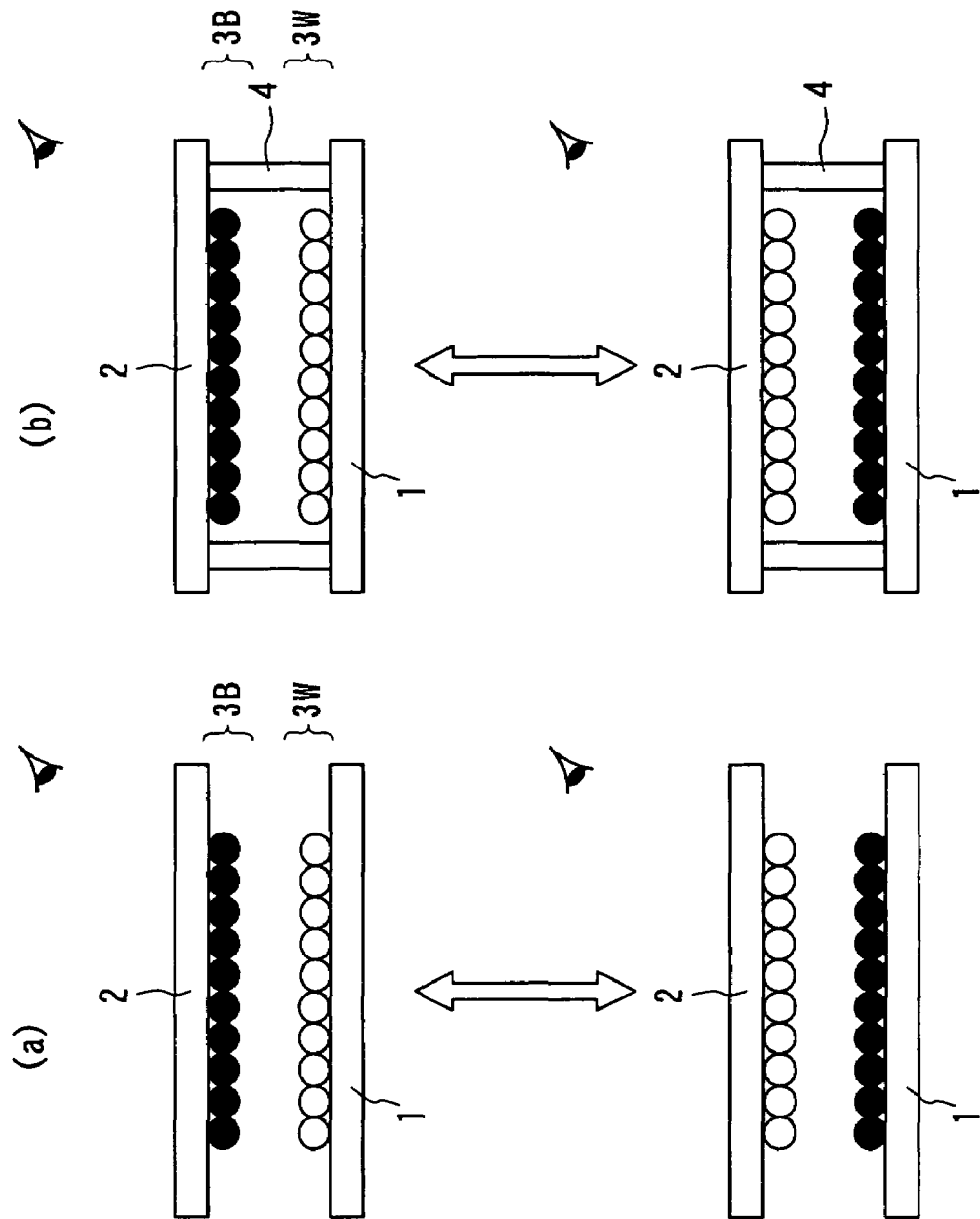
[FIG. 1]

Hereinafter, the best mode for carrying out the invention will be explained in detail.

At first, a basic construction of an information display panel used for an information display device according to the invention will be explained. In the information display device according to the present invention, an electrostatic field is applied by means of a certain means to the particles sealed between opposed substrates of the information display panel. Along a direction of electrostatic field, charged display media are attracted by means of a force due to electrostatic field or Coulomb's force, so that information such as an image can be displayed. Therefore, it is necessary to design the information display panel in such a manner that the display media can move evenly and maintain stability during a reciprocal operation or during a reserving state. Here, as to forces applied to the particles or the liquid powders utilized as the display media, there are an attraction force between the particles or the liquid powders due to Coulomb' force, an imaging force with respect to the electrode, an intermolecular force, a liquid bonding force and a gravity.

Examples of the information display used for the information display device according to the invention will be explained with reference to FIGS. 1a and 1b—FIGS. 3a and 3b.

In the examples shown in FIGS. 1a and 1b, at least two or more groups of display media 3 having different optical reflectance and different charge characteristics and consisting of at least one or more groups of particles (here, white color particles 3W and black color particles 3B are shown) are moved in a perpendicular direction with respect to substrates 1 and 2, in accordance with an electric field applied from electrodes (not shown) arranged outside of the substrates 1 and 2, so as to display a black color by viewing the black color particles 3B to an observer or so as to display a white color by viewing the white color particles 3W to the observer. In the example shown in FIG. 1b, a cell is formed by arranging for example grid-like partition walls 4 between the substrates 1 and 2, in addition to the example shown in FIG. 1a. Moreover, in FIG. 1b, the partition walls arranged at the near side are omitted.

In the examples shown in FIGS. 2a and 2b, at least two or more groups of display media 3 having different colors and different charge characteristics and consisting of at least one or more groups of particles (here, white color particles 3W and black color particles 3B are shown) are moved in a perpendicular direction with respect to substrates 1 and 2, in accordance with an electric field generated by applying a voltage between an electrode 5 arranged to the substrate 1 and an electrode 6 arranged to the substrate 2, so as to display a black color by viewing the black color particles 3B to an observer or so as to display a white color by viewing the white color particles 3W to the observer. In the example shown in FIG. 2b, a cell is formed by arranging for example grid-like partition walls 4 between the substrates 1 and 2, in addition to the example shown in FIG. 2a. Moreover, in FIG. 2b, the partition walls arranged at the near side are omitted.

In the examples shown in FIGS. 3a and 3b, one group of display media 3 having one color and one charge characteristic and consisting of at least one or more groups of particles (here, white color particles 3W) is moved in a parallel direction with respect to substrates 1 and 2, in accordance with an electric field generated by applying a voltage between the electrode 5 arranged to the substrate 1 and the electrode 6 arranged to the substrate 1, so as to display a white color by viewing the white color particles 3W to an observer or so as to display a color of the electrode 6 or the substrate 1 by viewing a color of the electrode 6 or the substrate 1 to the observer. In the example shown in FIG. 3b, a cell is formed by arranging for example grid-like partition walls 4 between the substrates 1 and 2, in addition to the example shown in FIG. 3a. Moreover, in FIG. 3b, the partition walls arranged at the near side are omitted.

The above explanations can be applied to a case such that the white color particles 3W are substituted by white color liquid powders or a case such that the black color particles 3B are substituted by black color liquid powders.

Hereinafter, the information display panel, which is a feature of the invention, will be explained in detail. FIG. 4a is a schematic view showing one construction of the information display panel used for the image display device according to the invention. The information display device according to the invention comprises, as shown in FIG. 4a, an information display panel 10, in which one or more groups of display media (here, not shown) are sealed between opposed two substrates 1 and 2, at least one substrate being transparent, and, in which the display media, to which an electrostatic field generated between the substrates 1 and 2 is applied, are made to move so as to display information such as an image. Here, as the substrate 1, use is made of a laminated substrate in which a first substrate 1a, a low elastic layer 1b and a second substrate 1c are successively laminated. In the same manner, as the substrate 2, use is made of a laminated substrate in which a first substrate 2a, a low elastic layer 2b and a second substrate 2c are successively laminated. In the case such that the electrode is arranged to the substrate, the electrode is arranged to an inner side of the substrate 1 and the substrate 2, or, the electrode is arranged to an inner side of the second substrate (1c or 2c) of the laminated substrate. In this case, a space between the substrates 1 and 2 is connected by means of an adhesive agent 11 applied on a rib of the partition wall 4 or by means of a sealing adhesive agent 12 applied to a peripheral portion of the substrate.

Figure 4:
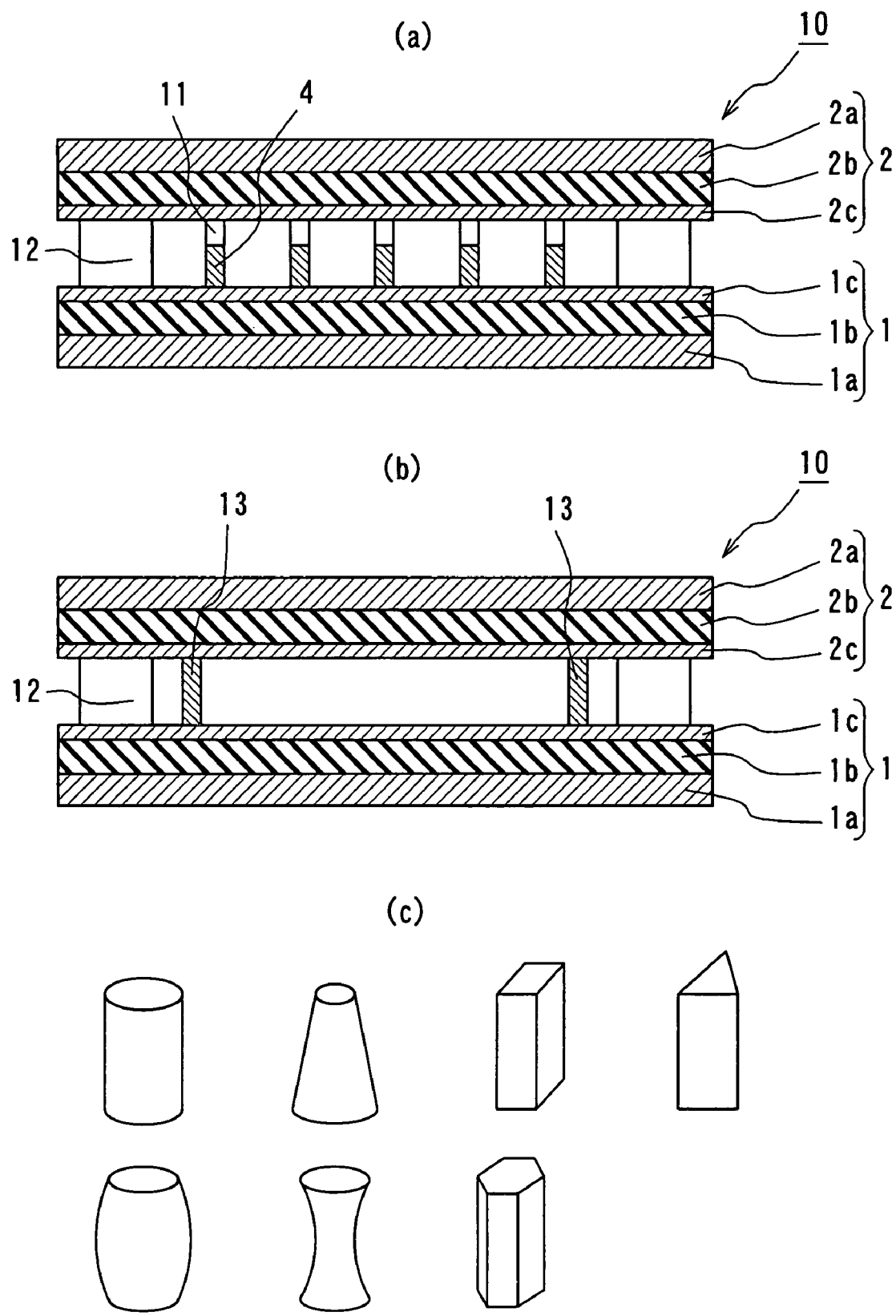
[FIG. 4]
Figure 5:
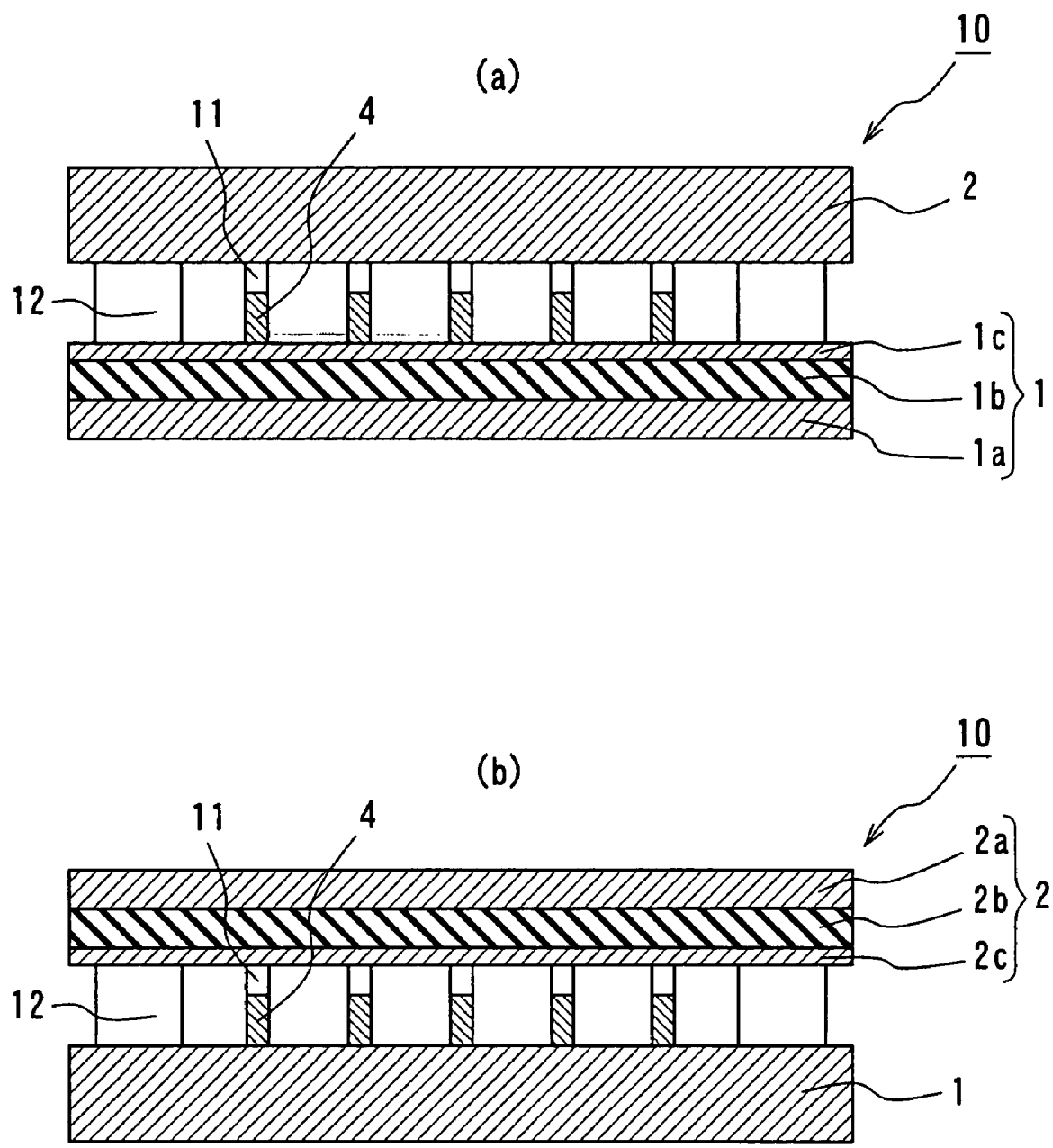
[FIG. 5]

In the information display panel according to the invention, a gap spacer 13 may be arranged instead of the partition walls so as to maintain a distance between the substrates according to need, and one substrate to which the gap spacer is arranged and the other substrate may be connected, as shown in FIG. 4b. In this case, a shape of the gap spacer 13 is preferred to be a columnar shape having a cross section such as circle, triangle, square, hexagon and so on, and having a flat top portion with a predetermined area, which is an adhesion portion with respect to the substrate. Moreover, in the information display panel according to the invention, one of the substrates 1 and 2 may only be the laminated substrate in which the first substrate, the low elastic layer and the second substrate are successively laminated, as shown in FIGS. 5a and 5b. In the two substrates according to the invention, one substrate, to which an external force is easy to be applied during the use of the information display panel, may be constructed by the laminated substrate, but, in order to improve a reliability on resistance to fracture, it is preferred to construct both two substrates by the laminated substrate as shown in FIG. 4.

According to the information display device of the invention, the laminated substrate, in which the first substrate, the low elastic layer and the second substrate are successively laminated, as at least one substrate of the substrate 1 and the substrate 2 in the information display panel 10. In this case, in the case such that a stress such as flexure and so on is applied to the substrate of the information display panel, to which an external force is applied, a stress concentration at a rib adhesion portion and so on of the partition walls constituting the cell between the substrates can be reduced due to the low elastic layer arranged in the laminated substrate as the substrate intermediate layer. Therefore, it is possible to provide the information display panel, which can maintain a mechanical strength with respect to an external force, and to provide the information display device in which the information display panel mentioned above is installed.

Hereinafter, respective members constituting the information display panel of the information display device, which is an object of the invention, will be explained.

As the substrate, at least one of the substrates is the transparent substrate through which a color of the display media can be observed from outside of the device, and it is preferred to use a material having a high transmission factor of visible light and an excellent heat resistance. The rear substrate may be transparent or may be opaque. The first substrate, the low elastic layer and the second substrate, which are the construction members of the substrate, will be explained hereinafter.

As the first substrate arranged to at least one substrate, use is made of a film such as cyclic polyolefin series, polystyrene series, acrylonitrile-styrene copolymer, acrylonitrile-butadiene-styrene cololymer, poly (meta)-acrylic resin series, polycarbonate resin series, polyethylene terephthalate series, polyethylene resin series of polyethylene naphthalate series, polyamide resin series, polyurethane resin series, fluorine resin series, acetal resin series, cellulose resin series, polyether sulfone series, and its thickness is preferred to be 30-200 μm. In the first substrates 1a and 2a, it is desirable to be made of a low permeable film having moisture prevention property, and also it is preferred that a lamination treatment by means of metal film, metal oxide film or organic film is subjected thereto so as to make it a low permeable state. Moreover, it is preferred that a surface treatment such as hard coat treatment, antireflection (AR) treatment or antiglare (AG) treatment is subjected to the first substrate. As the substrate arranged at a transparent side, use is made of a transparent first substrate.

As the low elastic layer arranged to at least one substrate, use is made of a tackiness agent such as rubber series, acrylic series, silicone series and so on, and its thickness is preferred to be 1-100 μm. In this case, if its dynamic elastic modulus is in a range of 0.01-10 MPa, use may be made of other tackiness agents. A transparent low elastic layer is used at the transparent substrate side. As the second substrate arranged to at least one substrate, use is made of a film such as cyclic polyolefin series, polystyrene series, acrylonitrile-styrene copolymer, acrylonitrile-butadiene-styrene cololymer, poly (meta)-acrylic resin series, polycarbonate resin series, polyethylene terephthalate series, polyethylene resin series of polyethylene naphthalaie series, polyamide resin series, polyurethane resin series, fluorine resin series, acetal resin series, cellulose resin series, polyether sulfone series, and its thickness is preferred to be 10-50 μm.

As the other substrate, use may be made of a glass substrate and so on having no flexibility. In this case, as the substrate material, use is made of inorganic sheets such as glass, quartz and so on having no flexibility. The thickness of the substrate is preferably 2 to 5000 μm, more preferably 5 to 2000 μm. When the thickness is too thin, it becomes difficult to maintain strength and distance uniformity between the substrates, and when the thickness is thicker than 5000 μm, there is a drawback as a thin-type information display panel.

As a material of the electrodes 5 and 6 arranged to a surface of the transparent substrate according to need, use is made of metals such as aluminum, silver, nickel, copper, gold, or, conductive metal oxides such as ITO (Indium tin oxide), indium oxide, conductive tin oxide, conductive zinc oxide and so on, or, conductive polymers such as polyaniline, polypyrrole, polythiophene and so on, and they are used by being suitably selected. As an electrode forming method, use is made of a method in which the materials mentioned above are made to a thin film by means of sputtering method, vacuum vapor deposition method, CVD (chemical vapor deposition) method, coating method and so on, or, a method in which conductive materials and solvents are mixed with synthetic resin binder and the mixture is sprayed. Additionally, the thickness of the electrode may be suitable unless the electroconductivity is absent or any hindrance exists in optical transparency, and it is preferable to be 3 to 1000 nm, more preferable to be 5 to 400 nm. The material and the thickness of the electrode 5 arranged to the rear substrate 1 are the same as those of the electrode 6, but transparency is not necessary. In this case, the applied outer voltage may be superimposed with a direct current or an alternate current.

As the partition wall 4 arranged according to need, a shape of the partition wall is suitably designed in accordance with a kind of the display media used for the display and is not restricted. However, it is preferred to set a width of the partition wall to 2-100 μm more preferably 3-50 μm and to set a height of the partition wall to 10-500 μm more preferably 10-200 μm. Moreover, as a method of forming the partition wall, use may be made of a double rib method wherein ribs are formed on the opposed substrates respectively and they are connected with each other and a single rib method wherein a rib is formed on one of the opposed substrates only. The present invention may be preferably applied to both methods mentioned above.

Figure 6:
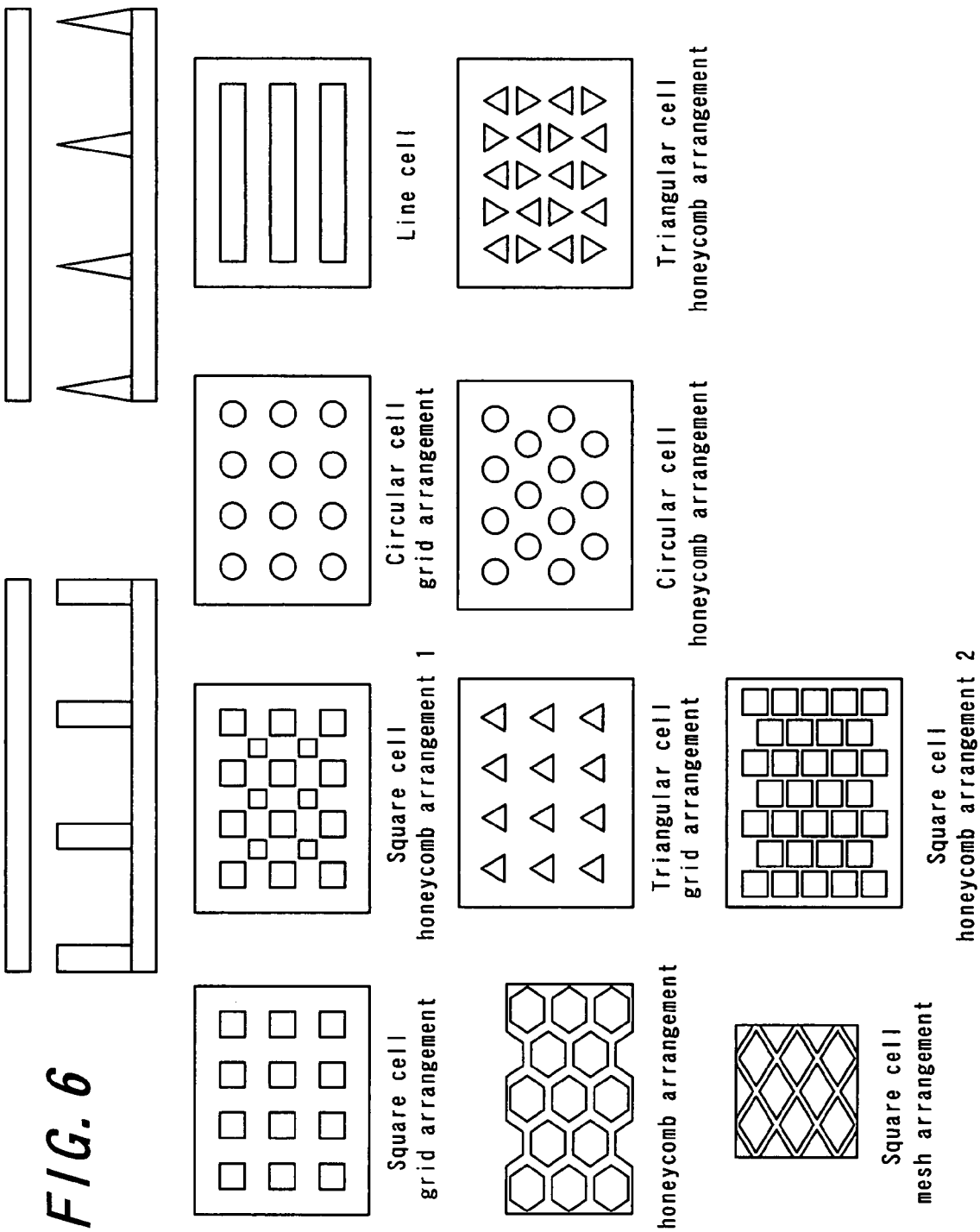
[FIG. 6]

The cell formed by the partition walls each made of rib has a square shape, a triangular shape, a line shape, a circular shape and a hexagon shape, and has an arrangement such as a grid, a honeycomb and a mesh, as shown in FIG. 6 viewed from a plane surface of the substrate. It is preferred that the portion corresponding to a cross section of the partition wall observed from the display side (an area of the frame portion of the cell) should be made as small as possible. In this case, a clearness of the image display can be improved. The formation method of the partition wall is not particularly restricted, however, a die transfer method, a screen-printing method, a sandblast method, a photolithography method and an additive method. Among them, it is preferred to use a photolithography method using a resist film or a die transfer method.

Then, liquid powders used as the display media in the information display panel, which is an object of the present invention, will be explained.

In the present invention, a term "liquid powders" means an intermediate material having both of liquid properties and particle properties and exhibiting a self-fluidity without utilizing gas force and liquid force. Preferably, it is a material having an excellent fluidity such that there is no repose angle defining a fluidity of powder. For example, a liquid crystal is defined as an intermediate phase between a liquid and a solid, and has a fluidity showing a liquid characteristic and an anisotropy (optical property) showing a solid characteristic (Heibonsha Ltd.: encyclopedia). On the other hand, a definition of the particle is a material having a finite mass if it is vanishingly small and receives an attraction of gravity (Maruzen Co., Ltd.: physics subject-book). Here, even in the particles, there are special states such as gas-solid fluidized body and liquid-solid fluidized body. If a gas is flown from a bottom plate to the particles, an upper force is acted with respect to the particles in response to a gas speed. In this case, the gas-solid fluidized body means a state that is easily fluidized when the upper force is balanced with the gravity. In the same manner, the liquid-solid fluidized body means a state that is fluidized by a liquid. (Heibonsha Ltd.: encyclopedia) In the present invention, it is found that the intermediate material having both of fluid properties and solid properties and exhibiting a self-fluidity without utilizing gas force and liquid force can be produced specifically, and this is defined as the liquid powders.

That is, as is the same as the definition of the liquid crystal (intermediate phase between a liquid and a solid), the liquid powders according to the invention are a material showing the intermediate state having both of liquid properties and particle properties, which is extremely difficult to receive an influence of the gravity showing the particle properties mentioned above and indicates a high fluidity. Such a material can be obtained in an aerosol state i.e. in a dispersion system wherein a solid-like or a liquid-like material is floating in a relatively stable manner as a dispersant in a gas, and thus, in the information display panel according to the invention, a solid material is used as a dispersant.

The information display panel which is a target of the present invention has a construction such that the liquid powders composed of a solid material stably floating as a dispersoid in a gas and exhibiting a high fluidity in an aerosol state are sealed between opposed two substrates, wherein one of two substrates is transparent. Such liquid powders can be made to move easily and stably by means of Coulomb's force and so on generated by applying a low voltage.

As mentioned above, the liquid powders used in the invention means an intermediate material having both of liquid properties and particle properties and exhibiting a self-fluidity without utilizing gas force and liquid force. Such liquid powders become particularly an aerosol state. In the information panel according to the invention, the liquid powders used in a state such that a solid material is relatively and stably floating as a dispersoid in a gas.

Then, the particles as the display media used in the information display panel according to the invention will be explained.

The particles may be composed of resins as a main ingredient, and can include according to need charge control agents, coloring agent, inorganic additives and so on as is the same as the known one. Hereinafter, typical examples of resin, charge control agent, coloring agent, additive and so on will be explained.

Typical examples of the resin include-urethane resin, urea resin, acrylic resin, polyester resin, acryl urethane resin, acryl urethane silicone resin, acryl urethane fluorocarbon polymers, acryl fluorocarbon polymers, silicone resin, acryl silicone resin, epoxy resins polystyrene resin, styrene acrylic resin, polyolefin resin, butyral resin, vinylidene chloride resin, melamine resin, phenolic resin, fluorocarbon polymers, polycarbonate resin, polysulfon resin, polyether resin, and polyamide resin. Two kinds or more of these may be mixed and used. For the purpose of controlling the attaching force with the substrate, acryl urethane resin, acryl silicone resin, acryl fluorocarbon polymers, acryl urethane silicone resin, acryl urethane fluorocarbon polymers, fluorocarbon polymers, silicone resin are particularly preferable.

Examples of the electric charge control agent include, but not particularly specified to, negative charge control agent such as salicylic acid metal complex, metal containing azo dye, oil-soluble dye of metal-containing (containing a metal ion or a metal atom), the fourth grade ammonium salt-based compound, calixarene compound, boron-containing compound (benzyl acid boron complex), and nitroimidazole derivative. Examples of the positive charge control agent include nigrosine dye, triphenylmethane compound, the fourth grade ammonium salt compound, polyamine resin, imidazole derivatives, etc. Additionally, metal oxides such as ultra-fine particles of silica, ultra-fine particles of titanium oxide, ultra-fine particles of alumina, and so on; nitrogen-containing circular compound such as pyridine, and so on, and these derivates or salts; and resins containing various organic pigments, fluorine, chlorine, nitrogen, etc. can be employed as the electric charge control agent.

As for a coloring agent, various kinds and colors of organic or inorganic pigments or dye as will be described below are employable.

Examples of black pigments include carbon black, copper oxide, manganese dioxide, aniline black, and activate carbon.

Examples of blue pigments include C.I. pigment blue 15:3, C.I. pigment blue 15, Berlin blue, cobalt blue, alkali blue lake, Victoria blue lake, phthalocyanine blue, metal-free phthalocyanine blue, partially chlorinated phthalocyanine blue, first sky blue, and Indanthrene blue BC.

Examples of red pigments include red oxide, cadmium red, diachylon, mercury sulfide, cadmium, permanent red 4R, lithol red, pyrazolone red, watching red, calcium salt, lake red D, brilliant carmine 6B, eosin lake, rhodamine lake B, alizarin lake, brilliant carmine 3B, and C.I. pigment red 2.

Examples of yellow pigments include chrome yellow, zinc chromate, cadmium yellow, yellow iron oxide, mineral first yellow, nickel titanium yellow, navel orange yellow, naphthol yellow S, hansayellow G, hansayellow 10G, benzidine yellow G, benzidine yellow GR, quinoline yellow lake, permanent yellow NCG, tartrazinelake, and C.I. pigment yellow 12.

Examples of green pigments include chrome green, chromium oxide, pigment green B, C.I. pigment green 7, Malachite green lake, and final yellow green G.

Examples of orange pigments include red chrome yellow, molybdenum orange, permanent orange GTR, pyrazolone orange, Balkan orange, Indanthrene brilliant orange RK, benzidine orange G, Indanthrene brilliant orange GK, and C.I. pigment orange 31.

Examples of purple pigments include manganese purple, first violet B, and methyl violet lake.

Examples of white pigments include zinc white, titanium oxide, antimony white, and zinc sulphide.

Examples of extenders include baryta powder, barium carbonate, clay, silica, white carbon, talc, and alumina white. Furthermore, there are Nigrosine, Methylene Blue, rose bengal, quinoline yellow, and ultramarine blue as various dyes such as basic dye, acidic dye, dispersion dye, direct dye, etc.

Examples of inorganic additives include titanium oxide, zinc white, zinc sulphide, antimony oxide, calcium carbonate, pearl white, talc, silica, calcium silicate, alumina white, cadmium yellow, cadmium red, titanium yellow, Pressian blue, Armenian blue, cobalt blue, cobalt green, cobalt violet, ion oxide, carbon black, manganese ferrite black, cobalt ferrite black, copper powder, aluminum powder.

These coloring agents and inorganic additives may be used alone or in combination of two or more kinds thereof. Particularly, carbon black is preferable as the black coloring agent, and titanium oxide is preferable as the white coloring agent.

Moreover, as the average particle-diameter $d(0.5)$ of the particles to be used, it is preferred to set $d(0.5)$ to 0.1-50 µm and to use even particles. If the average particle diameter $d(0.5)$ exceeds this range, the image clearness sometimes deteriorated, and, if the average particle diameter is smaller than this range, an agglutination force between the particles becomes too large and the movement of the particles is prevented.

Further, it is preferred that particle diameter distribution Span of the particles, which is defined by the following formula, is less 5 preferably less than 3:

$$\text{Span} = (d(0.9) - d(0.1))/d(0.5);$$

(here, $d(0.5)$ means a value of the particle diameter expressed by tm wherein an amount of the particles having the particle diameter larger than or smaller than this value is 50%, $d(0.1)$ means a value of the particle diameter expressed by µm wherein an amount of the particles having the particle diameter smaller than this value is 10%, and $d(0.9)$ means a value of the particle diameter expressed by µm wherein an amount of the particles having the particle diameter smaller than this value is 90%).

If the particle diameter distribution Span of the particles is set to not more than 5, the particle diameter becomes even and it is possible to perform an even particle movement.

Furthermore, as a correlation between the particles, it is preferred to set a ratio of $d(0.5)$ of the particles having smallest diameter with respect to $d(0.5)$ of the particles having largest diameter to not more than 50 preferably not more than 10. The particles having different charge characteristics with each other are moved reversely, even if the particle diameter distribution Span is made smaller. Therefore, it is preferred that the particle sizes of the particles are made to be even with each other, and same amounts of the particles are easily moved in a reverse direction, and thus that is this range.

Here, the particle diameter distribution and the particle diameter mentioned above can be measured by means of a laser diffraction/scattering method. When a laser light is incident upon the particles to be measured, a light intensity distribution pattern due to a diffraction/scattering light occurs spatially. This light intensity distribution pattern corresponds to the particle diameter, and thus it is possible to measure the particle diameter and the particle diameter distribution.

In the present invention, it is defined that the particle diameter and the particle diameter distribution are obtained by a volume standard distribution. Specifically, the particle diameter and the particle diameter distribution can be measured by means of a measuring apparatus Mastersizer 2000 (Malvern Instruments Ltd.) wherein the particles setting in a nitrogen gas flow are calculated by an installed analysis software (which is based on a volume standard distribution due to Mie's theory).

Further, in the present invention, in the case such that the particles or the liquid powders are used as the display media, it is important to control a gas in a gap surrounding the particles and liquid powders between the substrates, and a suitable gas control contributes an improvement of display stability. Specifically, it is important to control a humidity of the gap gas to not more than 60% RH at 25° C., preferably not more than 50% RH, more preferably not more than 35% RH.

Figure 2:
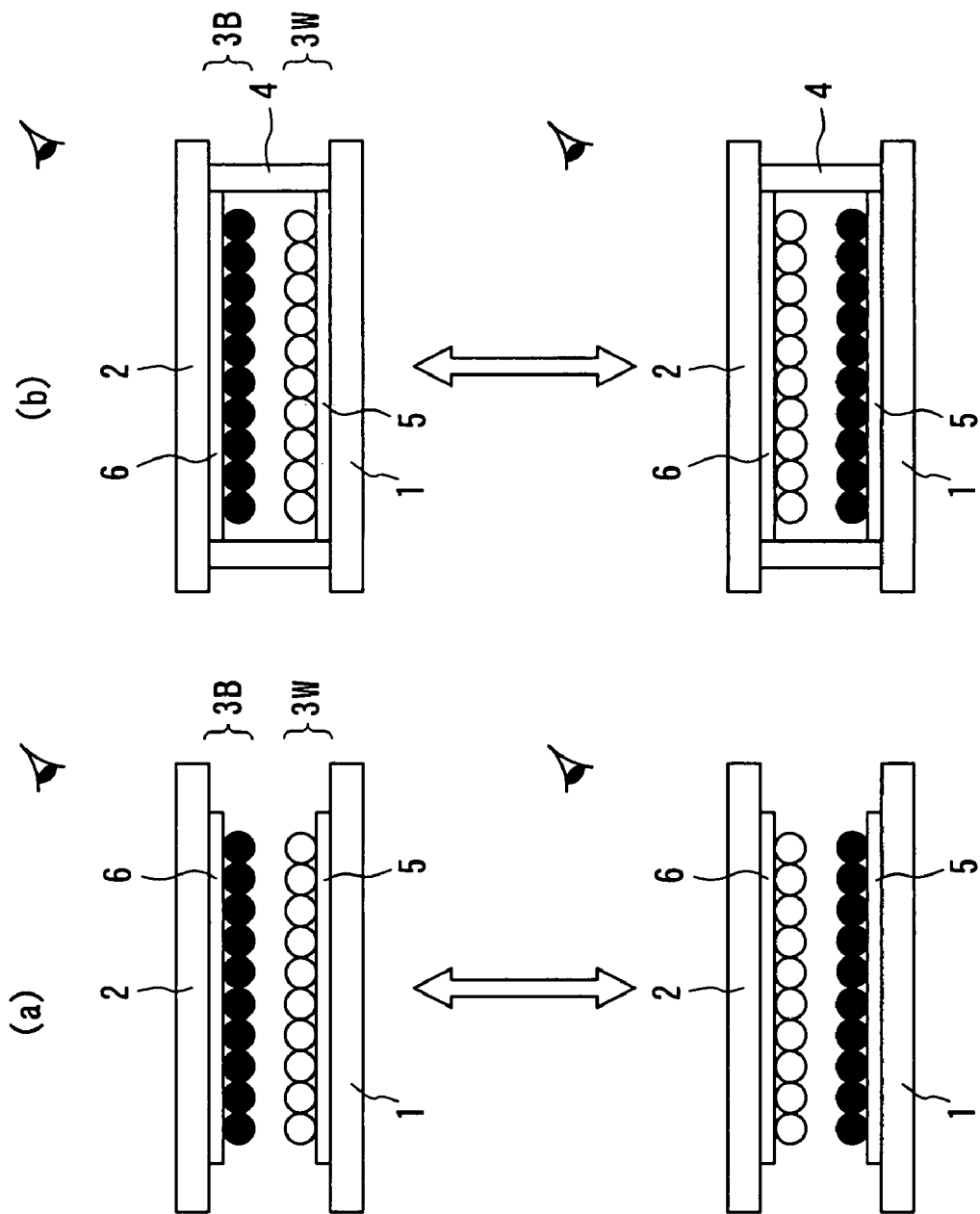
[FIG. 2]
Figure 3:
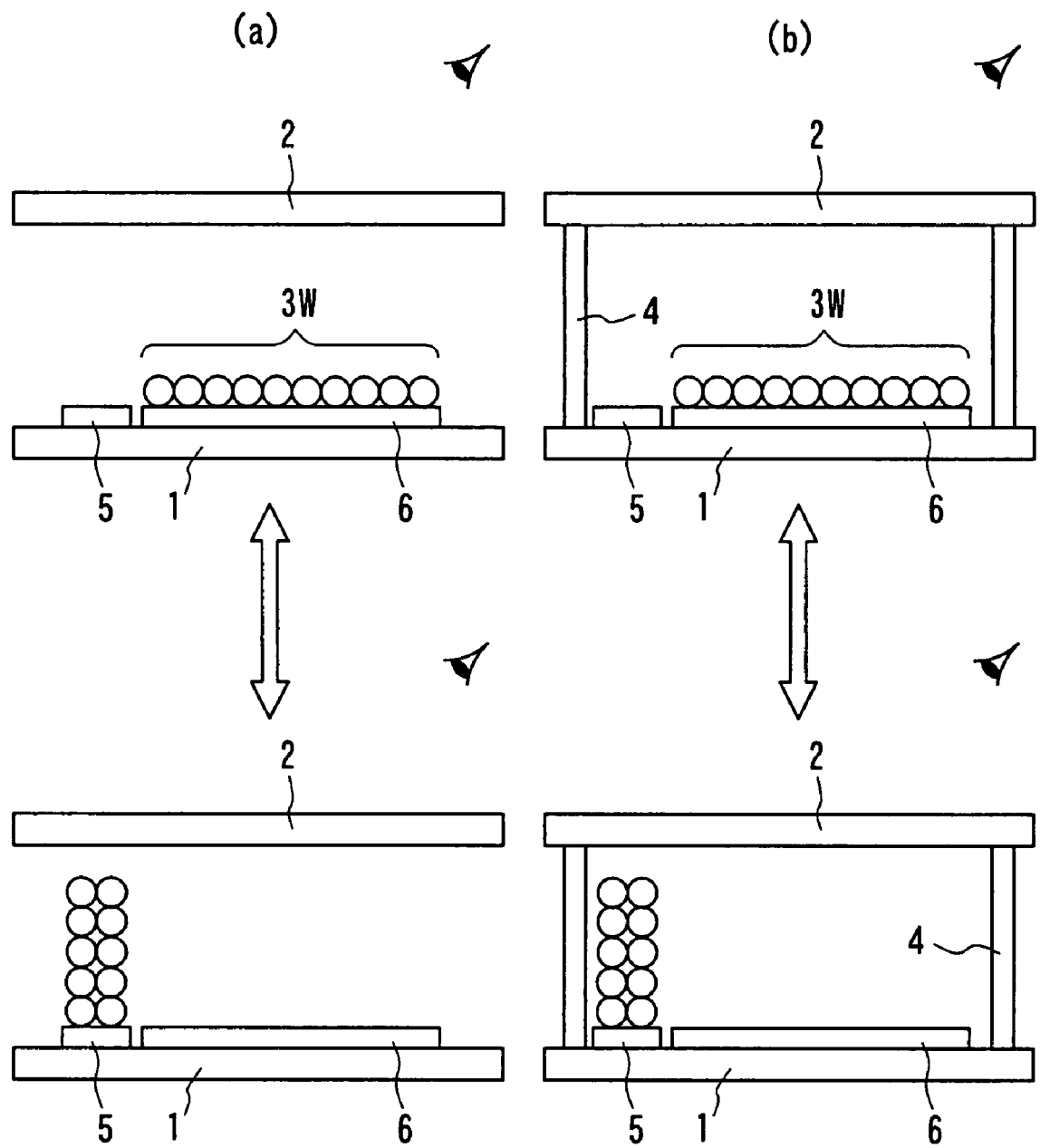
[FIG. 3]

The above gap means a gas portion surrounding the particles (liquid powders) obtained by substituting the electrodes 5, 6, an occupied portion of the particles (liquid powders) 3, an occupied portion of the partition walls 4 and a seal portion of the device from the space between the substrate 1 and the substrate 2 for example in FIGS. 1 and 2.

A kind of the gap gas is not limited if it has the humidity mentioned above, but it is preferred to use dry air, dry nitrogen gas, dry argon gas, dry helium gas, dry carbon dioxide gas, dry methane gas and so on. It is necessary to seal this gas in the device so as to maintain the humidity mentioned above. For example, it is important to perform the operations of filling the particles or liquid powders and assembling the substrate under an atmosphere having a predetermined humidity and to apply a seal member and a seal method for preventing a humidity inclusion from outside of the device.

In the information display panel according to the invention, an intervals between the substrates is not restricted if the display media can be moved and a contrast can be maintained, and it is adjusted normally to 10-500 µm, preferably 10-200 µm.

Moreover, it is preferred to control a volume occupied rate of the display media in a space between the opposed substrates to 5-70%, more preferably 5-60%. If the volume occupied rate of the particles or the liquids powders exceeds 70%, the display media become difficult to move, and if it is less than 5%, a sufficient contrast cannot be obtained and a clear image display is not performed.

As the display media used in the present invention, the particles or the liquid powders used in the gas are explained heretofore, but the present invention may be preferably used for liquid display media in liquid crystal or electrophoresis.

EMBODIMENTS

Hereinafter, the present invention will be explained further specifically with reference to the examples according to the invention, but the present invention is not limited to the following examples.

Example 1

As shown in FIG. 4, the two substrates were respectively made of the laminated substrate, and the partition walls were formed to one substrate, so that the information display panel 10 was manufactured. At first, as shown in Table 1, the substrate 1 that is a film substrate, in which the first substrate 1a made of PET film and having a thickness of 100 μm, the low elastic layer 1b made of acrylic tackiness agent and having a thickness of 10 μm, and the second substrate 1c made of PET film and having a thickness of 25 μm were successively laminated, was manufactured. In the same manner, the substrate 2 that is a film substrate, in which the first substrate 2a made of PET film and having a thickness of 100 μm, the low elastic layer 2b made of acrylic tackiness agent and having a thickness of 10 μm, and the second substrate 2c made of PET film and having a thickness of 25 μm were successively laminated, was manufactured. As the low elastic layers 1b and 2b, use was made of "1811L, product of Soken Chemical & Engineering Co., Ltd., dynamic elastic modulus: 0.07 MPa". Instead, it was possible to use "UV3000, product of The Nippon Synthetic Chemical Industry Co., Ltd. (adding 5 phr of IRGACURE184, as photo initiator, product of Ciba Specialty Chemicals K. K.), dynamic elastic modulus: 0.07 MPa". Then, ITO electrode of 30 Ω/square was coated on a surface of the second substrates 1c and 2c respectively.

Then, the partition walls each having a width of 100 μm and a height of 100 μm were formed on the second substrate 1c, to which ITO electrodes were coated, so as to form open portions of 300 μm square (this portion became a cell) by means of a photo-resist method. After that, the white color particles and the black color particles were filled in the cell respectively at a density of 6 g/m$^2$ by means of a free-fall method. Subsequently, the adhesive agent 11 (in this example, use was made of "AE901B, product of Ajinomoto Fine-Techno. Co., Inc., curing temperature: 60° C.") was applied on a rib of the partition wall 4 of the substrate 1, and the sealing agent 12 was applied to a peripheral portion of the second substrate 1c of the substrate 1 and to a peripheral portion of the second substrate 2c of the substrate 2. After that, the substrate 1 and the substrate 2 were connected in such a manner that positions of the opposed electrodes not shown formed on the second substrates 1c and 2c were aligned, and then the adhesive agent was cured.

Figure 7:
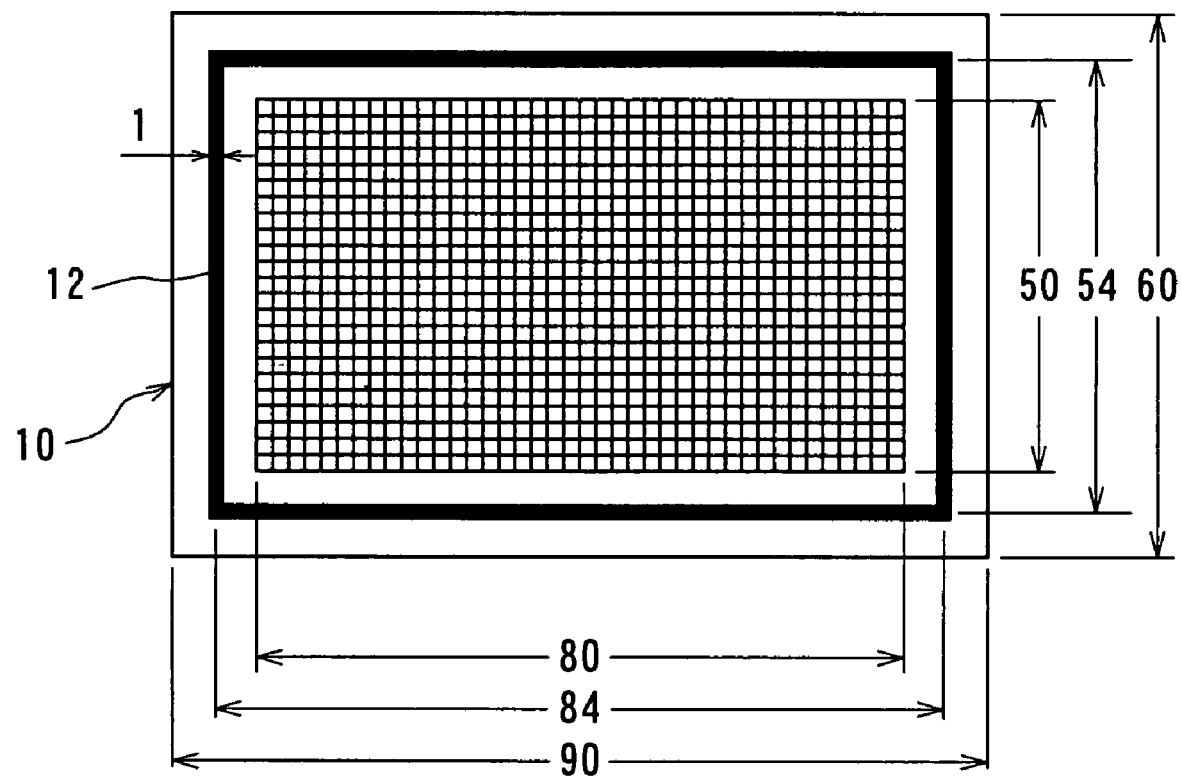
[FIG. 7]

As shown in FIG. 7, the information display panel 10 manufactured according to the method mentioned above had a dimension such that outer sizes of the substrate 1 and the substrate 2 were 90 mm×60 mm, an outer size of the seal portion was 84 mm×54 mm and a width of the seal portion was 1 mm, and an outer size of the display portion was 80 mm×50 mm.

Example 2

The information display panel 10 having the construction shown in FIG. 4 was manufactured according to the manner as is the same as the example 1 except that the thickness of the low elastic layers 1b and 2b was changed to 25 μm as shown in Table 1.

Example 3

The information display panel 10 having the construction shown in FIG. 4 was manufactured according to the manner as is the same as the example 1 except that the thickness of the low elastic layers 1b and 2b was changed to 50 μm as shown in Table 1.

Example 4

The information display panel 10 having the construction shown in FIG. 4 was manufactured according to the manner as is the same as the example 1 except that the thickness of the low elastic layers 1b and 2b was changed to 25 μm and the thickness of the second substrates 1c and 2c was changed to 38 μm as shown in Table 1.

Example 5

The information display panel 10 having the construction shown in FIG. 4 was manufactured according to the manner as is the same as the example 1 except that the material of the low elastic layers 1b and 2b was changed to acrylic UV curing resin "UV3000, product of The Nippon Synthetic Chemical Industry Co., Ltd. (adding 5 phr of IRGACURE184, as photo initiator, product of Ciba Specialty Chemicals K. K.)" and the thickness of the low elastic layers 1b and 2b was changed to 50 μm as shown in Table 1.

Comparative Example 1

As shown in Table 1, the substrate 1 was constructed only by the second substrate 1c made of PET film and having a thickness of 100 μm, and the substrate 2 was constructed only by the second substrate 2c made of PET film and having a thickness of 100 μm. Then, the information display panel was manufactured in such a manner that the other portions were same as those of the example 1.

Comparative Example 2

As shown in Table 1, the substrate 1 was constructed only by the second substrate 1c made of PES (polyether sulfon resin series) film and having a thickness of 200 μm, and the substrate 2 was constructed only by the second substrate 2c made of PES (polyether sulfon resin series) film and having a thickness of 200 μm. Then, the information display panel was manufactured in such a manner that the other portions were same as those of the example 1.

<Estimation>

Figure 8:
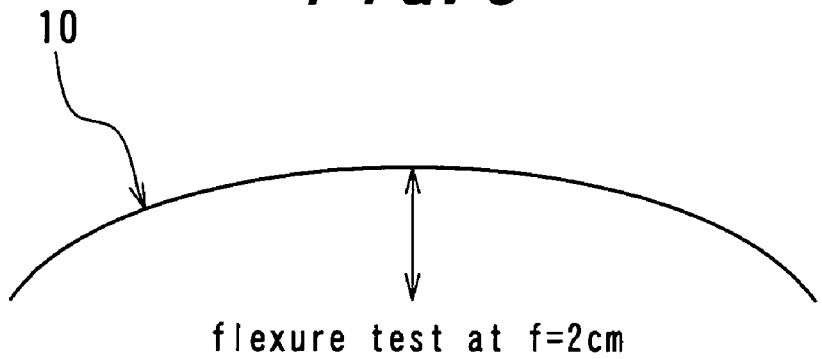
[FIG. 8]

As shown in FIG. 8, a repeated flexure test of the information display panel was performed under the condition of flexure along a longitudinal direction f=2 cm and 1000 timed repetition, and then it was confirmed by the naked eyes that no peeling-off portion of the substrate was existent.

In this estimation, as shown in Table 1, it was confirmed that the examples 1-5 had no peeling-off portion, but the comparative examples 1 and 2 had a peeling-off portion and thus shown by NG (x).

TABLE 1

|  |  |  | Example 1 | Example 2 | Example 3 | Example 4 | Example 5 | Comparative example 1 | Comparative example 2 |
|---|---|---|---|---|---|---|---|---|---|
| Laminated substrate | First substrates 1a, 2b | Material | PET film | PET film | PET film | PET film | PET film | None | None |
|  |  | Thickness (μm) | 100 | 100 | 100 | 100 | 100 |  |  |
|  | Low elastic layers 1b, 2b | Material | Acrylic tackiness agent | Acrylic tackiness agent | Acrylic tackiness agent | Acrylic tackiness agent | Acrylic tackiness agent of UV curing type | None | None |
|  |  | Thickness (μm) | 10 | 25 | 50 | 25 | 50 |  |  |
|  | Second substrates 1c, 2c | Material | PET film | PET film | PET film | PET film | PET film | PET film | PES film |
|  |  | Thickness (μm) | 25 | 25 | 25 | 38 | 25 | 100 | 200 |
| Results of repeated flexure test |  |  | ○ | ○ | ○ | ○ | ○ | X | X |

As clearly understood from the above test results, since, in the information display panel according to the examples 1-5, the low elastic layer was laminated, a stress concentration at a rib adhesion portion and so on of the partition walls 4, which form the cell between the substrates, can be reduced even in the case such that a stress such as flexure and so on is applied to the tow substrates. Therefore, it is possible to obtain a desired mechanical strength while the information display panel has flexibility.

INDUSTRIALLY APPLICABILITY

The image display device using the information display panel according to the invention, is applicable to the image display unit for mobile equipment such as notebook personal computers, PDAs, cellular phones, handy terminal and so on; to the electric paper for electric book, electric newspaper and so on; to the bulletin boards such as signboards, posters, blackboards and so on; to the image display unit for electric calculator, home electric: application products, auto supplies and so on; to the card display unit for point card, IC card and so on; and to the display unit for electric POP, electric advertisement, electric price tag, electric bin tag, electric musical score, RF-ID device and so on.

The invention claimed is:

1. An information display panel, in which one or more groups of display media are sealed between opposed two substrates, at least one substrate being transparent, and, in which the display media, to which an electrostatic field generated between the substrates is applied, are made to move so as to display information such as an image,
   characterized in that at least one substrate of the two substrates is a laminated substrate in which a first substrate, a low elastic layer and a second substrate are successively laminated from an outer surface, and
   characterized in that the two substrates are constructed by the laminated substrate, and the first substrate and the second substrate are made of a film substrate so as to obtain flexibility.

2. The information display panel according to claim 1, characterized in that, in the laminated substrate, at least one of the first substrate, the low elastic layer and the second substrate is constructed by a material having a water barrier property, while, in the other substrate, the substrate is constructed by a material having a water barrier property.

3. The information display panel according to claim 1, characterized in that the display media are particles or liquid powders.

4. An information display device, characterized in that the information display panel set forth in claim 1 is installed.

5. An information display panel, in which one or more groups of display media are sealed between opposed two substrates, at least one substrate being transparent, and, in which the display media, to which an electrostatic field generated between the substrates is applied, are made to move so as to display information such as an image,
   characterized in that at least one substrate of the two substrates is a laminated substrate in which a first substrate, a low elastic layer and a second substrate are successively laminated from an outer surface, and
   characterized in that, in the case such that a front substrate at an observer side is constructed by the laminated substrate, the first substrate, the low elastic layer and the second substrate are constructed by a transparent material.

6. The information display panel according to claim 5, characterized in that, in the laminated substrate, at least one of the first substrate, the low elastic layer and the second substrate is constructed by a material having a water barrier property, while, in the other substrate, the substrate is constructed by a material having a water barrier property.

7. The information display panel according to claim 5, characterized in that the display media are particles or liquid powders.

8. An information display device, characterized in that the information display panel set forth in claim 5 is installed.

9. An information display panel, in which one or more groups of display media are sealed between opposed two substrates, at least one substrate being transparent, and, in which the display media, to which an electrostatic field generated between the substrates is applied, are made to move so as to display information such as an image,
   characterized in that at least one substrate of the two substrates is a laminated substrate in which a first substrate, a low elastic layer and a second substrate are successively laminated from an outer surface, and
   characterized in that, in the case such that a front substrate at an observer side is constructed by the laminated substrate, the first substrate, the low elastic layer, the second substrate and an electrode arranged to an inner side of the second substrate are constructed by a transparent material.

10. The information display panel according to claim 9, characterized in that, in the laminated substrate, at least one of the first substrate, the low elastic layer and the second substrate is constructed by a material having a water barrier property, while, in the other substrate, the substrate is constructed by a material having a water barrier property.

11. The information display panel according to claim 9, characterized in that the display media are particles or liquid powders.

12. An information display device, characterized in that the information display panel set forth in claim 9 is installed.

13. An information display panel, in which one or more groups of display media are sealed between opposed two substrates, at least one substrate being transparent, and, in which the display media, to which an electrostatic field generated between the substrates is applied, are made to move so as to display information such as an image, characterized in that at least one substrate of the two substrates is a laminated substrate in which a first substrate, a low elastic layer and a second substrate are successively laminated from an outer surface, and characterized in that the low elastic layer has dynamic elastic modulus of 0.01-10 MPa and is made of adhesive agent or tackiness agent having a thickness of 1-100 μm.

14. The information display panel according to claim 13, characterized in that, in the laminated substrate, at least one of the first substrate, the low elastic layer and the second substrate is constructed by a material having a water barrier property, while, in the other substrate, the substrate is constructed by a material having a water barrier property.

15. The information display panel according to claim 13, characterized in that the display media are particles or liquid powders.

16. An information display device, characterized in that the information display panel set forth in claim 13 is installed.

* * * * *